(12) United States Patent
Geckler et al.

(10) Patent No.: US 9,249,746 B2
(45) Date of Patent: Feb. 2, 2016

(54) SYSTEM AND METHOD FOR ENGINE CONTROL USING PRE-CHAMBER IGNITION

(71) Applicant: Cummins Inc., Columbus, IN (US)

(72) Inventors: Samuel G. Geckler, Columbus, IN (US); Anthony Kyle Perfetto, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/296,069

(22) Filed: Jun. 4, 2014

(65) Prior Publication Data

US 2015/0354481 A1 Dec. 10, 2015

(51) Int. Cl.
| F02B 33/44 | (2006.01) |
| F02D 41/00 | (2006.01) |
| F02B 19/12 | (2006.01) |
| F02B 19/10 | (2006.01) |

(52) U.S. Cl.
CPC .......... *F02D 41/0057* (2013.01); *F02B 19/108* (2013.01); *F02B 19/12* (2013.01)

(58) Field of Classification Search
CPC ..... F02D 41/0057; F02B 19/12; F02B 19/108
See application file for complete search history.

(56) References Cited

U.S. PATENT DOCUMENTS

| 3,948,227 A |   | 4/1976 | Guenther |         |
|-------------|---|--------|----------|---------|
| 4,141,324 A | * | 2/1979 | Karaba   | 123/259 |
| 5,709,189 A | * | 1/1998 | Monnier  | 123/260 |
| 7,204,225 B2 | * | 4/2007 | Kubo et al. | 123/266 |
| 8,006,666 B2 | * | 8/2011 | Ashida et al. | 123/275 |
| 8,074,620 B2 | * | 12/2011 | Filipek et al. | 123/266 |
| 2008/0236144 A1 | * | 10/2008 | Nakata et al. | 60/284 |
| 2009/0076713 A1 | * | 3/2009 | Bailey et al. | 701/103 |
| 2012/0060497 A1 |   | 3/2012 | Roth |   |
| 2012/0103302 A1 | * | 5/2012 | Attard | 123/260 |
| 2013/0055985 A1 |   | 3/2013 | Gruber et al. |   |
| 2013/0118461 A1 | * | 5/2013 | Mitchell et al. | 123/681 |
| 2014/0069380 A1 | * | 3/2014 | Leone et al. | 123/406.12 |
| 2014/0144406 A1 | * | 5/2014 | Schock et al. | 123/260 |

FOREIGN PATENT DOCUMENTS

| WO | 2006079818 | 8/2006 |
| WO | 2011127494 | 10/2011 |
| WO | 2012061397 | 5/2012 |

OTHER PUBLICATIONS

A Review of Pre-Chamber Initiated Jet Ignition Combustion Systems, SAE International 2010-01-2263, Oct. 25, 2010, 26 pgs.

* cited by examiner

*Primary Examiner* — Jesse Bogue
(74) *Attorney, Agent, or Firm* — Taft, Stettinius & Hollister LLP

(57) ABSTRACT

A system and method are disclosed for controlling an engine using pre-chamber ignition. According to at least one aspect of the present disclosure, the system includes a pre-chamber ignition system in communication with a combustion cylinder of the engine. The ignition system includes a pre-chamber having a pre-chamber injector, an igniter, and a pre-chamber port structured to introduce a purge gas into the pre-chamber. The system further includes an exhaust gas recirculation system to dilute a main charge introduced into the cylinder. The ignition system improves engine efficiency and lowers emissions.

24 Claims, 3 Drawing Sheets

SYSTEM AND METHOD FOR ENGINE CONTROL USING PRE-CHAMBER IGNITION

TECHNICAL FIELD

The present disclosure generally relates to internal combustion engines and, more particularly, to systems and methods for the use of pre-chamber ignition.

BACKGROUND

Modern internal combustion engines must meet stringent emission standards that include limits on the amount of soot, oxides of nitrogen (hereafter "$NO_x$" to include nitric oxide (NO) and nitrogen dioxide ($NO_2$)), carbon monoxide (CO), unburned hydrocarbons (HC), and various greenhouse gases that may be emitted from an engine in operation. Many engines now utilize aftertreatment systems to reduce engine-out emissions to allowable regulatory levels before release to the atmosphere, including lean-burn, compression-ignition engine systems such as diesel engines and stoichiometric, spark-ignition engine systems such as gasoline engines.

The operating conditions of an engine, including the ratio of air to fuel used and the peak combustion temperature within the engine, may affect the amount and type of emissions generated. A "lean mixture" is one in which the ratio of air to fuel is greater than the stoichiometric mixture, which is the ratio where exactly enough oxygen is available to consumed all of the available fuel. For example, gasoline has a stoichiometric air-to-fuel ratio ("AFR") of about 14.7:1 by mass, meaning the mixture is stoichiometric when about 6.8% of the mass of the mixture is fuel (i.e., gasoline). Lower AFRs, referred to as "rich mixtures," may result in unreacted fuel in the exhaust gases due to an insufficient amount of oxygen. Unreacted fuel may also be the result of insufficient mixing of the fuel within the charge gas mixture. Higher, lean AFRs may cause the combustion process to become unstable due to an insufficient concentration of fuel to maintain the combustion process or due to a slower combustion reaction that does not run to completion within a single combustion stroke of the engine, both of which may lead to increased HC emissions and lower thermal efficiency. Further, lean AFRs tend to generate a mix of exhaust gases that render the conventional and widely-used three-way catalytic converters ineffective because three-way catalytic converters depend on a specific balance of exhaust species to effectively complete the necessary oxidation and reduction reactions to eliminate undesirable emissions.

Lean-burn systems may expel more $NO_x$ emissions than an engine using a stoichiometric AFR due to an excess of oxygen and nitrogen in the combustion process and the difficulty of catalyzing and reducing such emissions. Nonetheless, lean-burn systems may be more fuel efficient due to the lower quantity of fuel added to a given volume of air in the combustion process. Exhaust gas recirculation ("EGR"), in which a portion of the engine's exhaust gas flow is routed into the intake flow into the engine's combustion cylinders (referred herein as "EGR gases"), has been used in both lean-burn and stoichiometric systems to reduce engine-out emissions. However, the use of lean AFR in spark-ignition engine systems has been limited for several reasons, including poor combustion stability, which may increase HC emissions, lower thermal efficiency, and incompatibility with three-way catalytic converter. Accordingly, there remains a need for further contributions in this area of technology.

SUMMARY

A system and method are disclosed for controlling an engine using pre-chamber ignition. According to at least one aspect of the present disclosure, the system includes a pre-chamber ignition system in communication with a combustion cylinder of the engine. The ignition system includes a pre-chamber having a pre-chamber injector, an igniter, and a pre-chamber port structured to introduce a purge gas into the pre-chamber. The system further includes an exhaust gas recirculation system to dilute a main charge introduced into the cylinder. The ignition system increases the thermal efficiency of the engine, lowers the emissions from the engine, and may enable the engine to meet regulatory emissions requirements without the use of an aftertreatment system. This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
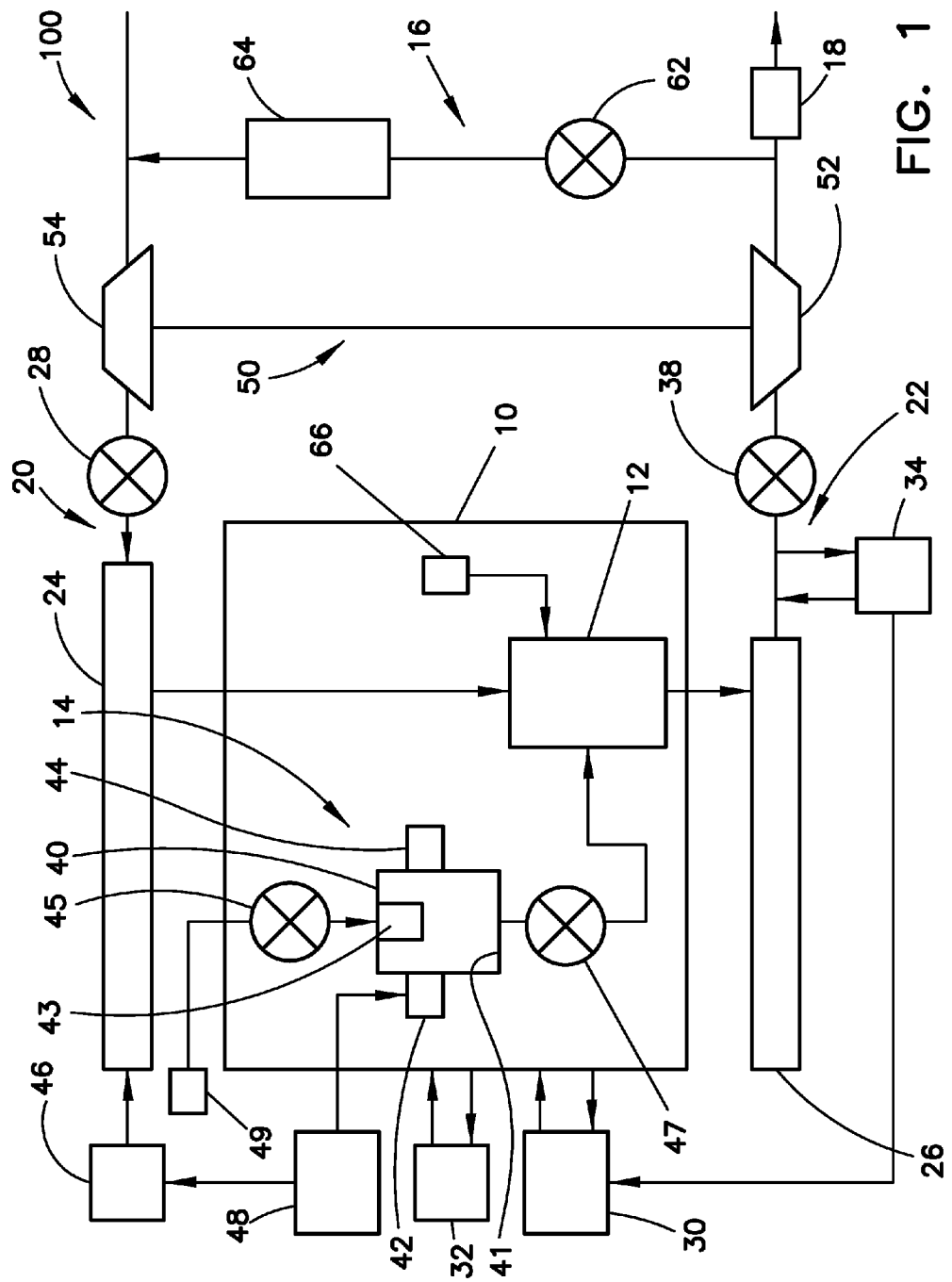
FIG. 1 is a schematic block diagram of an embodiment of an engine system according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

An engine system 100 for increasing engine efficiency and lowering emissions using a pre-chamber ignition system is shown in FIG. 1. Under certain operating conditions the engine system 100 may meet regulatory emissions requirements without the use of an aftertreatment system. The system 100 may include an internal combustion engine 10 structured to generate mechanical power from combustion of a mixture of fuel and charge gases, in which the fuel is oxidized by the charge gases to produce mechanical power. Combustion of the mixture generates combustion product gases, which may include but not be limited to carbon dioxide, water, air (including nitrogen and oxygen), $NO_x$, HC, and CO among others. The engine 10 may include a spark-ignition internal combustion engine. The fuel may include but not be limited to gasoline, ethanol, alcohol, blended fuels including gasoline and alcohol, hydrogen, compressed natural gas, liquid propane gas, and other suitable fuels capable of being oxidized in air.

The system 100 may include an intake system 20 to enable the flow of charge gases into the engine 10 and an exhaust system 22 to enable the flow of combustion product gases from the engine 10. Combustion product gases that exit the engine 10 via the exhaust system 22 are hereinafter referred to as exhaust gases. Combustion product gases that remain in the engine 10 for the next combustion cycle are hereinafter referred to as residuals. Accordingly, the exhaust gases may include but not be limited to carbon dioxide, water, air (including nitrogen and oxygen), $NO_x$, HC, and CO among others. As described further herein, the charge gases may include ambient air, residuals, and recirculated exhaust gases.

The intake system 20 may include an intake manifold 24 in fluid communication with the engine 10 to enable the flow of the charge gases into a combustion cylinder 12 of the engine 10 via one or more intake ports (not shown) into the cylinder 12. The cylinder 12 may include a piston (not shown) mechanically linked to a crankshaft to convert the chemical energy released during the combustion process to mechanical power and to convey the mechanical power to an intended use. The cylinder 12 may include intake valves (not shown) disposed in the intake ports and structured to open and close the one or more intake ports, thereby controlling the timing of flow from the intake manifold 24 into the cylinder 12. Though only one cylinder 12 is depicted in FIG. 1, in certain embodiments the engine 10 may include a plurality of cylinders 12. In such embodiments, the intake manifold 24 may distribute the charge gases to each of the plurality of cylinders 12, which each include a piston, ports and valves.

The intake system 20 may include an intake throttle 28 to control the flow of charge gases into the intake manifold 24, thereby controlling the combustion process and power output generated by the engine 10. In at least one embodiment, the intake system 20 may include other means of controlling power output in addition to or besides the intake throttle 28 as described further herein. The intake system 20 may further include a main injector 46 in fluid communication with a fuel supply 48 and the cylinder 12. The main injector 46 is structured and operable to introduce a prescribed amount of fuel into the charge gases to create a main charge, which is a desired mixture of fuel and charge gases having a prescribed AFR to be burned in the combustion process during a single combustion stroke of the engine 10. The main injector 46 may be at least partially disposed in the intake manifold 24 or in a branch of the intake manifold 24 in fluid communication with the cylinder 12. In such an embodiment, the prescribed amount of fuel may be injected into the charge gases as they flow into the cylinder 12 through the one or more intake ports, often called port injection. In certain embodiments, the main injector 46 may be at least partially disposed in the cylinder 12. In such an embodiment, the prescribed amount of fuel may be injected into the charge gases once they have entered the cylinder 12, often called direct injection. In such an embodiment, the engine system 100 may include an individual main injector 46 for each cylinder 12 in the system 100. In certain embodiments, the AFR of the main charge may be stoichiometric or lean.

The exhaust system 22 may include an exhaust manifold 26 in fluid communication with the cylinder 12 via one or more exhaust ports (not shown) and structured to convey the combustion product gases from the cylinder 12 as exhaust gases. Communication between the cylinder 12 and the exhaust manifold 26 may be controlled by exhaust valves (not shown) disposed in the one or more exhaust ports and structured to open and close the exhaust ports, thereby controlling the timing of flow of combustion product gases into the exhaust manifold 26 from the cylinder 12. The exhaust system 22 may include an exhaust throttle 38 to control the flow of exhaust gases from the exhaust manifold 26, thereby affecting the amount of residuals remaining in the cylinder 12 after an exhaust stroke of the engine 10.

In certain embodiments, the exhaust system 22 may further include an aftertreatment system 18 disposed downstream of the exhaust manifold 26 and structured to treat the exhaust gases to eliminate unwanted emissions by further reduction or oxidation of the exhaust gases. The aftertreatment system 18 may include but not be limited to one or more of a diesel oxidation catalyst ("DOC"), selective catalytic reduction ("SCR") catalyst, a filtration component, either catalyzed or uncatalyzed (e.g., a diesel particulate filter ("DPF")), a cleanup catalyst (e.g., an ammonia oxidation catalyst), a two-way catalytic converter, and a three-way catalytic converter. In certain alternative embodiments, the exhaust system 22 does not include the aftertreatment system 18.

The system 100 may further include a turbocharger 50 in communication between the exhaust system 22 and the intake system 20. The turbocharger 50 may include a turbine 52 within the exhaust system 22 and in fluid communication with the flow of exhaust gases exiting the exhaust manifold 26. The turbine 52 may be disposed upstream of the aftertreatment system 18 and be structured to convert at least a portion of the energy of the relatively hot and high pressure exhaust gases into a torque. The turbocharger 50 may further include a compressor 54 within the intake system 20, in fluid communication with the flow of charge gases upstream of the intake manifold 24, and driven by the torque generated by the turbine 52. The compressor 54 may be structured to compress the charge gases and push an increased mass of charge gases through the intake manifold 24 and into the cylinder 12, thereby increasing the power output of the engine 10 in proportion to the mass of the charge gases pushed into the cylinder 12. In at least one embodiment, the compressor 54 may be disposed upstream of the intake throttle 28. The turbocharger 50 may include, but not be limited to, a multiple stage turbocharger or a turbocharger including a wastegate or bypass valve in certain embodiments. Additionally or alternatively, the system 100 may include a mechanically driven supercharger in communication with the intake system 20 and capable of pushing compressed charge gases through the intake manifold 24 and into the cylinder 12.

In at one embodiment of the present disclosure, the turbocharger 50 may be a variable geometry turbocharger ("VGT"). In such an embodiment, the turbocharger 50 may enable a form of EGR under certain operating conditions by adjusting an aspect ratio of the VGT relative to the speed of the engine 10. The aspect ratio may be adjusted by opening and closing inlet guide vanes within the VGT. A small aspect ratio at high engine speeds may choke the intake flow into, and the exhaust gas flow out of, the cylinders 12, leading to high exhaust system pressures that may exceed the pressure of intake manifold 24 (i.e., backpressure), thereby causing a portion of the combustion product gases to remain in the cylinders 12 as residuals instead of exiting via the exhaust system 22 as exhaust gas. Although excessive engine backpressure may be detrimental to overall fuel efficiency, residual EGR may be sufficient to reduce $NO_x$ emissions below regulatory requirements at least during transient events (e.g., gear changes).

Further referring to FIG. 1, the system 100 may include an EGR system 16 in fluid communication between the intake system 20 and the exhaust system 22 to enable the flow of exhaust gases from the exhaust system 22 to the intake system 20 and subsequently back into the cylinder 12. The EGR system 16 may include an EGR valve 62 to control the flow of exhaust gases from the exhaust system 22 to the intake system 20. Exhaust gases routed through the EGR system 16 and into the intake system 20 may be referred to as "EGR gases." The introduction of EGR gases into the intake manifold 24 and subsequently into the main charge in the cylinder 12 dilutes the main charge without affecting its AFR. Because the EGR gases contain little if any oxygen, the addition of EGR gas does not change the ratio of oxygen to fuel in the main charge and, thus, does not change its AFR. However, adding EGR gas lowers the charge density of the fuel in the main charge and potentially may decrease the rate and stability of combustion accordingly.

In at least one embodiment, the EGR system 16 may include a cooler 64 in line with the EGR valve 62 and structured to transfer heat from the exhaust gases routed therethrough. The cooler 64 may be any type of suitable heat exchanger and may, by cooling the exhaust gases flowing through the EGR system 16, increase the mass of the EGR gases routed back into the intake manifold 24 and cylinder 12. In at least one embodiment, the EGR system 16 may include a bypass line (not shown) to selectively bypass the cooler 64 and route uncooled exhaust gases to the intake system 20 as desired. Such an embodiment of the EGR system 16 may be effective under low engine load conditions. In embodiments that include the turbocharger 50 and/or the aftertreatment system 18, the EGR system 16 may be positioned between the exhaust system 22 and the intake system 20 downstream of the turbine 52 and/or the aftertreatment system 18 and upstream of the compressor 54.

The amount of EGR gas introduced into the intake manifold 24 may be adjusted via the EGR valve 62 to match a prescribed EGR fraction target which is determined for and varies with the operating speed and/or load conditions of the engine 10. The EGR fraction target may be based on input from physical or virtual sensors that determine the conditions within the cylinder 12 at a combustion cycle during given speed and/or load conditions. Virtual sensors may include analytical models based on available sensor input to estimate such operating parameters as charge flow and EGR flow. Input from physical sensors may include fuel throttle position and/or sudden change in torque demanded, which may further be the result of a virtual sensor estimate. For example, the amount of EGR gas may be decreased as engine load increases to increase peak power output to meet the load demand. EGR gas may also be reduced under idling engine conditions of low speed and no load due to combustion instability. Conversely, the amount of EGR gas may be increased under relatively high speed, low load conditions.

In at least one embodiment, the engine system 100 may include a variable valve timing ("VVT") system 66, whereby the amount of EGR gas introduced into the intake manifold 24 may be further adjusted by timing the opening and closing of the intake and exhaust valves of the cylinder 12 to enable a prescribed amount of the residuals to be pushed directly from the cylinder 12 into the intake manifold 24. For example, EGR gas may be introduced into the intake manifold 24 by opening the intake valve during a portion of an exhaust stroke of the engine 10. Generally, during an exhaust stroke the piston is moving within the cylinder 12 to push the combustion product gases generated by a previous combustion cycle out of the cylinder 12 and into the exhaust manifold 26. With the intake valve open, at least a portion of the combustion product gases are pushed into the intake manifold 24. During the subsequent intake stroke of the engine 10, during which the piston is moving to induct charge gases into the cylinder 12, the residuals pushed into the intake manifold 24 during the previous exhaust stroke may be inducted into the cylinder 12 and mixed with the charge gases, resulting in uncooled EGR. Consequently, EGR may be implemented via valve timing using the VVT system 66. The VVT system 66 may be particularly effect at controlling the amount of EGR gas in the cylinder 12 at low engine loads. In certain embodiments, the VVT system 66 may include any configuration that enables, without limitation, closing the intake throttle 28 early or late, thereby reducing the fluid mass in the cylinder, and opening the exhaust throttle 38 early, thereby providing increased fluid temperature from the cylinder into the exhaust. Consequently, in certain embodiments, the amount of EGR gas introduced into the intake manifold 24 may be adjusted using the EGR valve 62, intake throttle 28, exhaust throttle 38, VVT system 66, VGT 50, or by other means described herein. Thus, the amount of EGR gas introduced into the intake manifold 24 may be adjusted to meet the EGR fraction target, which is determined for and varies with the operating speed and load conditions of the engine 10.

Figure 2:
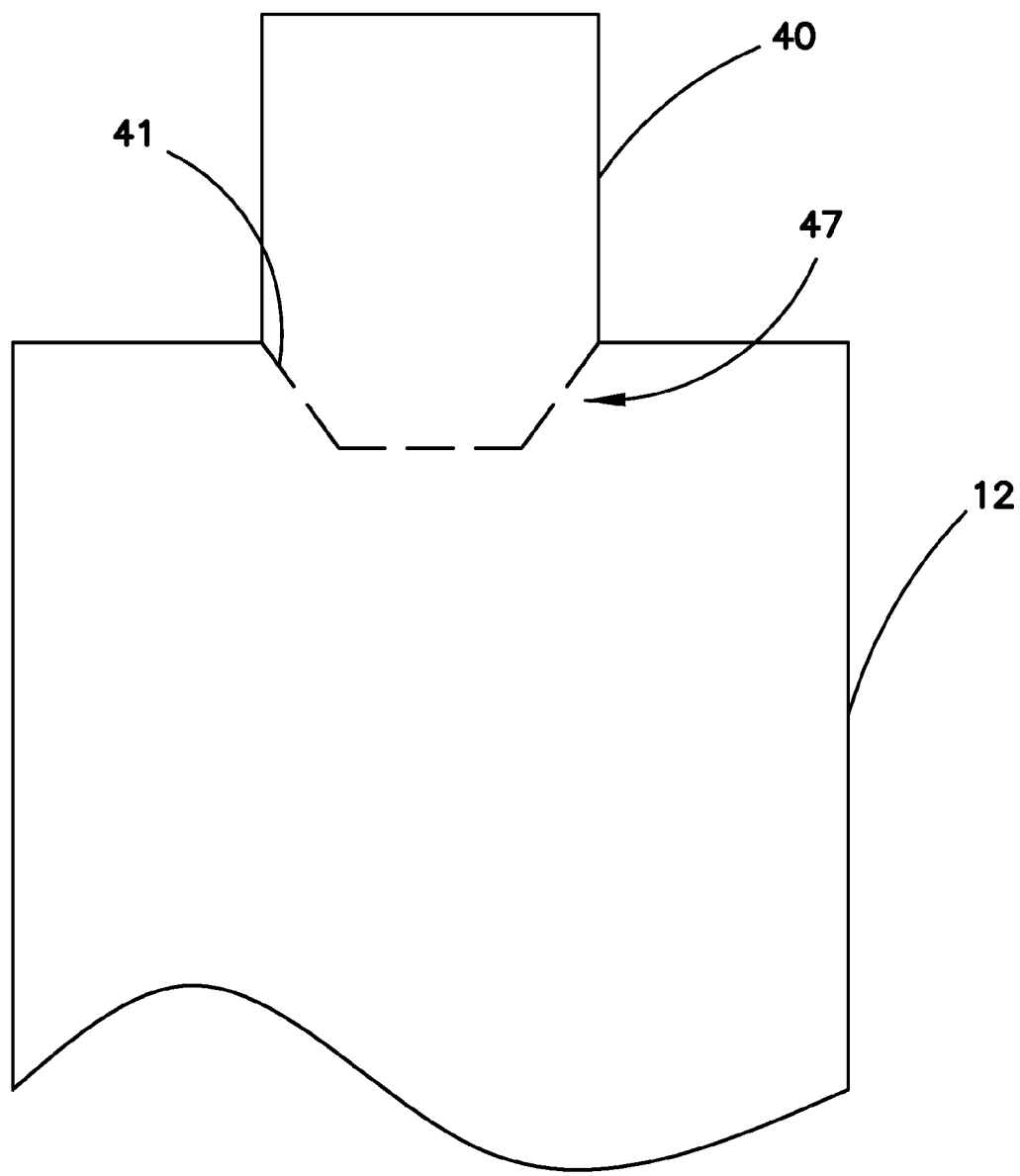
FIG. 2 is a schematic diagram of an embodiment of a pre-chamber according to the present disclosure.

As shown in FIG. 1, the engine system 100 may further include an ignition system 14 disposed within the engine 10 and structured to initiate the combustion of the main charge in the cylinder 12. The ignition system 14 is in fluid communication with the cylinder 12 and, in certain embodiments, may be at least partially disposed within the cylinder 12. The ignition system 14 may include a pre-chamber 40 having a volume at least partially defined by a pre-chamber wall 41, the pre-chamber 40 separate from but in communication with the cylinder 12. As shown in FIG. 2, the pre-chamber 40 may communicate with the cylinder 12 via one or more orifices 47 in the pre-chamber wall 41, which may separate the pre-chamber 40 from the cylinder 12. In such an embodiment, the one or more orifices 47 may include one or more one-way valves operable to limit the flow of charge gases, residuals, or combustion product gases from the cylinder 12 into the pre-chamber 40 while enabling flow from the pre-chamber 40 into the cylinder 12. Alternatively, the pre-chamber 40 may communicate with the cylinder 12 via a channel at least partially defined by the pre-chamber wall 41 and connecting the pre-chamber 40 and cylinder 12. In certain embodiments, the volume of the pre-chamber 40 may be about 1-5% of the displacement of the cylinder 12. The system 100 may include one ignition system 14 for each cylinder 12 of the engine 10.

Referring to FIG. 1, the ignition system 14 may include a pre-chamber injector 42 structured and operable to introduce a prescribed amount of fuel into the pre-chamber 40. The pre-chamber injector 42 may be at least partially disposed within the pre-chamber 40 or may be at least in communication with the pre-chamber 40. The fuel introduced by the pre-chamber injector 42 mixes with gases present in the pre-chamber 40 to form a desired combustible pre-chamber charge. The pre-chamber charge may be a lean, stoichiometric or rich mixture depending on the operating conditions of the engine 10, such as speed and load. In at least one embodiment, the pre-chamber injector 42 may inject the fuel during the intake stroke, instead of during the compression stroke as in a conventional spark-ignition engine. In at least one embodiment, the amount of fuel introduced into the pre-chamber 40 by the pre-chamber injector 42 may be less than about 10% of the combined total of the fuel introduced into the cylinder 12 by the main injector 46 and pre-chamber injector 42. The pre-chamber charge may include atmospheric air, boosted or pressurized air, EGR gases, and/or residuals as described further herein. The ignition system 14 may further include an igniter 44 disposed at least partially in the pre-chamber 40 to initiate combustion of the pre-chamber charge. The igniter 44 may be a spark plug or other suitable ignition device structured to initiate combustion.

In operation, the ignition system 14 may enable the engine 10 to operate with greater fuel efficiency and increased thermal efficiency than a conventional spark-ignition internal combustion engine while generating fewer undesirable emissions. Consequently, the ignition system 14 may enable the engine 10 to operate within regulatory emissions standards without the need for an aftertreatment system 18, such as a three-way catalytic converter or lean $NO_x$ aftertreatment system. The ignition system 14 uses partial combustion of the pre-chamber charge to initiate distributed ignition of the main charge in the cylinder 12, thus supporting complete and reliable combustion of overall. Upon ignition by the igniter 44, the pre-chamber charge begins to burn and expands rapidly due to its own combustion pressure, forming ignition gases comprised of pre-chamber combustion products, uncombusted pre-chamber charge, and/or reactive radical chemical species resulting from partially combusted pre-chamber charge. The combustion pressure of the burning pre-chamber charge forces the ignition gases into the cylinder 12, thereby igniting the main charge. Ignition of the main charge may be caused by the high temperature of the ignition gases, by the reactive radical species in the ignition gases, and/or by propagation of the flame front from the pre-chamber 40.

In embodiments where the pre-chamber 40 is connected to the cylinder 12 by multiple orifices 47 through the pre-chamber wall 41 as shown in FIG. 2, each orifice 47 may form a turbulent jet of ignition gases that penetrates and ignites a different region of the main charge. The generation and distribution of multiple turbulent ignition sites increases the burn rate of the main charge by decreasing the distance any given flame front must travel before intersecting an adjacent flame front from a different ignition site. The burn rate of the main charge may be further increased by turbulent mixing of the pre-chamber ignition gases with the main charge, thus further shortening combustion durations. Accordingly, the ignition system 14 may generate multiple, distributed ignition sites, which rapidly consume the main charge. Further, the generation and distribution of multiple ignition sites improves combustion stability, particularly in lean and dilute AFR mixtures, ensuring that all of the fuel in both the main charge and pre-chamber charge is combusted to completion, which reduces the amount of resulting CO and HC emissions in the exhaust gases.

The size of the orifice 47 separating the pre-chamber 40 and the cylinder 12 further affects the rate and stability of the combustion of the main charge within the cylinder 12. If the orifice size is too small, the jet of ignition gases may penetrate with such a high velocity that the jet may fail to ignite the main charge due to an excessive velocity gradient. Moreover, the smaller the orifice 47 the greater may be the loss of heat from the ignition gases, which may decrease the pressure rise in the cylinder 12, thereby lowering thermal efficiency of the engine 10. However, larger orifice sizes may fail to produce a jet of ignition gases that penetrate sufficiently into the main charge to enable suitable combustion rates and stability. In at least one embodiment, the one or more orifices 47 in the pre-chamber wall 41 may be sized such that the flame front generated in and proceeding from the pre-chamber 40 to the cylinder 12 is extinguished as the flame front passing through each orifice 47. In such an embodiment, the ignition gases may initiate combustion of the main charge in multiple locations at a distance from the pre-chamber 40 via thermal, turbulent, and chemical effects as the reactive radical species resulting from partially combusted pre-chamber charge penetrate into and react with the main charge before igniting it.

Because the pre-chamber 40 may be in communication with but at least partially separated from the cylinder 12, the pre-chamber 40 may have varying amounts of residual post-combustion gases after a given combustion cycle and exhaust stroke of the engine 10. Under certain operating conditions the exhaust stroke may not repeatably clear an adequate amount of the combustion product gases from the pre-chamber 40 for reliable pre-chamber combustion. Similarly, because the pre-chamber 40 may be at least partially separated from the cylinder 12, under certain operating conditions the intake stroke may not reliably introduce a sufficient amount of the charge gases into the pre-chamber 40 for reliable pre-chamber combustion. Accordingly, a purge gas may be introduced into the pre-chamber 40 to scavenge internal residual gases from the pre-chamber 40 and introduce pre-chamber charge gases into the pre-chamber 40 for the subsequent combustion stroke. The purge gas may be introduced into the pre-chamber 40 during an exhaust stroke, an intake stroke, and/or a compression stroke of the engine cycle. Further, the timing of introducing purge gas may be controlled depending on the amount of total internal residual gas in cylinder 12 during the intake and/or compression stroke or as a function of the amount of external EGR gas added.

According to at least one embodiment of the present disclosure as shown in FIG. 1, the pre-chamber 40 may include a pre-chamber port 43 through the pre-chamber wall 41 to enable fluid communication between the pre-chamber 40 and a source of purge gas 49. Purge gas may be introduced into the pre-chamber 40 from the purge gas source 49 via the pre-chamber port 43 as regulated by a purge flow device 45. In at least one embodiment, the pre-chamber port 43 may further be connected to the EGR system 16 such that EGR gas may be introduced into the pre-chamber 43 as well as the cylinder 12. Consequently, the pre-chamber port 43 enables a desired mix of pre-chamber charge gases to be introduced into the pre-chamber 40 separate from the intake ports and valves of the cylinder 12. The purge flow device 45 may be any suitable flow control device. In at least one embodiment, the purge flow device 45 may be a valve. Alternatively, the purge flow device 45 may be an injector structured and operable to introduce a prescribed volume of purge gas into the pre-chamber 40. In such an embodiment, the prescribed volume of purge gas may be controlled by the on-time and injection pressure of the purge flow device 45. In at least one embodiment, the purge flow device 45 may include a mass flow device capable of determining the mass, and thereby volume, of the purge gas introduced into the pre-chamber 40.

The purge gas may be any suitable gas that contains free oxygen for oxidation of the fuel, including but not limited to atmospheric air or pressurized air from a boosting system. In certain embodiments, the purge gas source 49 may be the intake system 20, either at atmospheric pressure or at elevated pressure from the turbocharger 50 or other air compressor included in the system 100. In embodiments where the purge gas is pressurized, the mass of the purge gas introduced into the cylinder 12 may be equivalent to between about zero and 50 times the volume of the pre-chamber 40. In embodiments where the one or more orifices 47 include one or more one-way valves operable to limit the flow of main charge gases from the cylinder 12 into the pre-chamber 40, the volume of purge gas needed to adequately scavenge the pre-chamber 40 may be reduced. In at least one embodiment in which the engine 10 include a plurality of cylinders 12 and associated pre-chambers 40, the system 100 may include a pre-chamber manifold (not shown) structured to provide purge gas to each of the plurality of pre-chambers 40. In such an embodiment, the system 100 may include one pre-chamber injector 42 and a plurality of pre-chamber igniters 44.

In at least one embodiment, the purge gas may be oxygen-enriched air, where a portion of the nitrogen has been removed by a suitable pre-treatment system. Alternatively, the purge gas may be a mixture of air and fuel. In at least one embodiment, the pre-chamber injector 42 may be in communication with the pre-chamber port 43 such that the prescribed amount of fuel may be introduced upstream of the pre-chamber port 43 and transported into the pre-chamber 40 upon the opening of the pre-chamber port 43. Thus, the purge gas may include a pre-mixed pre-chamber charge at a desired AFR. In such an embodiment, the fuel may be the same fuel as used in the main charge, or the fuel may be a different type of fuel, such as natural gas (i.e., methane), hydrogen, an alcohol or the like. In certain embodiments, the fuel introduced into the purge gas may be supplied by a fuel reformation system connected to the engine system 100, where the fuel reformation system produces synthesis gas (or "syngas"), which may include a mixture of hydrogen and carbon monoxide, among others. Accordingly, the purge gas may include any combination of reactive agents that enable a combustion process within the pre-chamber 40.

The ignition system 14 may further enable the timing of ignition of the main charge to be advanced in the combustion stroke and may enable increased effective compression ratio without causing in engine knock. Knock refers to a phenomenon where a portion of the uncombusted main charge beyond the flame front explodes due to excessive heat and/or pressure during the combustion process. Knock is undesirable because the resulting spike of the pressure in the cylinder may damage the engine in the long term. Because temperature and pressure are proportional in the combustion process, knock may be mitigated by controlling these factors and/or by limiting the time the main charge is subjected to the peak temperature and pressure.

Concerning the duration of the combustion process, the main charge may be ignited at a crank angle prior to the top dead-center position ("TDC") of the piston within the cylinder 12 to allow time for the combustion process to run its course and build peak pressure for the most recovery of work from the expanding combustion gases under the given conditions, such as engine speed and load. In a conventional spark-injection engine, due to its relatively slow burn rate, the ignition event must occur relatively early in the compression stroke to avoid knock. As engine speed increases, ignition must occur farther in advance of TDC to allow time for the combustion process to run its course. However, earlier ignition farther ahead of TDC results in increased pumping losses as the piston must work to compress both the initial main charge and the rapidly expanding combustion product gases that exert an opposing force on the piston. Because the ignition system 14 increases the burn rate of the main charge, ignition may be initiated closer to TDC than in a conventional spark-injection engine, thereby decreasing pumping losses. Advancing ignition timing further enables the effective compression ratio of the engine 10 to be increased without causing knock because the yet unburned main charge beyond the boundary of the flame front is not subjected to the combination of heat and pressure beyond a certain duration, specifically the delay period of the fuel. Consequently, the ignition system 14 may increase the efficiency of the engine 10 by enabling ignition of the pre-chamber charge, and subsequently the main charge, closer to TDC at high engine speeds and loads, thus effectively increasing the compression ratio of the engine 10 without causing knock.

Dilution of the main charge with EGR gases may further mitigate knock and may reduce the formation of undesirable emissions form the engine 10 during operation. Introducing EGR gases, which have little or no oxygen, into the cylinder 12 lowers the combustion temperature of the combustion process, which may reduce the amount of $NO_x$ generated during combustion and lower the likelihood of knock. Further, EGR gases, being comprised of mostly carbon dioxide and water vapor, have a higher specific heat than the air introduced into the cylinder 12, thereby further lowering peak combustion temperatures and $NO_x$ formation. Accordingly, dilution with EGR gases may reduce the formation of $NO_x$ and the disassociation of $CO_2$ to CO and of water to free hydrogen. Lower peak combustion temperature may further reduce the loss of thermal energy from the combusted and/or combusting main charge to the walls of the cylinder 12, leaving more energy available for conversion to the mechanical work of driving the piston. However, dilution of the main charge may cause combustion instability in the cylinder 12 by lowering the concentration of reactants in the main charge. Nonetheless, the ignition system 14 may enable stable combustion of the main charge at high levels of dilution by generating multiple, distributed ignitions sites as described herein.

Moreover, the introduction of dilute EGR gases into the cylinder 12 may further dilute the pre-chamber charge in the pre-chamber 40, potentially causing combustion instability of the pre-chamber charge, including a failure to ignite, particularly where the residuals from a previous combustion stroke linger in the pre-chamber 40. In such an instance, the pre-chamber charge may include a significant proportion of exhaust gases containing little or no oxygen. To mitigate such a condition, the pre-chamber 40 may be scavenged with purge gas as described herein.

The ignition system 14 may further improve the efficient operation of the engine system 100 by enabling control of the power generated by the engine 10 via adjustments in the amount of dilution (i.e., residual or EGR gas) added to the main charge instead of via throttling of the intake flow, which introduces pressure losses known as throttling losses, as in a conventional spark-ignition engine. The introduction of EGR gases into the intake manifold 24 enables the intake throttle 28 to be opened further to enable an adequate amount of air to enter the cylinder 12 to form the main charge. Opening the intake throttle 28 further results in a desired increased pressure in the intake manifold 24 and reduced throttling losses.

In at least one embodiment according to the present disclosure as shown in FIG. 1, the engine system 100 may further include a controller 30 in communication with the engine 10 and the systems of the system 100. The controller 30 may be structured to control parameters of the engine 10, which may include those aspects of the engine 10 that may be controlled with an actuator activated by the controller 30. Specifically, the controller 30 may be in communication with actuators and sensors 32 for receiving and processing sensor input and transmitting actuator output signals. Actuators may include, but not be limited to, the intake throttle 28, exhaust throttle 38, intake and exhaust valves, EGR valve 62, purge valve 45, main injector 46, pre-chamber injector 42, and igniter 44. The sensors 32 may include any suitable devices to monitor parameters and functions of the engine system 100. For example, the sensors 32 may include a knock sensor to detect and measure engine knocking, an engine speed sensor may measure the rotational speed of an engine crankshaft, camshaft, or the like, and one or more pressure sensors to measure the pressure of gases in the intake manifold 24 and exhaust manifold 26, flowing into and out of the cylinder 12. In at least one embodiment, the engine system 100 may include an oxygen sensor 34 (i.e., a lambda sensor) in communication with the controller 30 and structured to determine characteristics of the exhaust gases and indirectly estimate the concentration of regulated emissions in the exhaust gases, including but not limited to $NO_x$, CO, and HC. In one example, the oxygen sensor 34 may determine the concentration of oxygen in the exhaust gases as a proxy for the concentration of regulated emissions. In certain embodiments, the oxygen sensor 34 may be in communication with the cylinder 12 to determine the conditions therein.

In addition to the types of sensors described herein, any other suitable sensors 32 and their associated parameters may be encompassed by the system and methods. Accordingly, the sensors 32 may include any suitable device used to sense any relevant physical parameters including electrical, mechanical, and chemical parameters of the engine system 100. For example, the sensors 32 my include suitable devices to enable the determination of engine load, including torque sensors, fuel quantity sensors, or air volume sensors that may be used as a proxy of the load on the engine. As used herein, the term "sensors" may include any suitable hardware and/or software used to sense any engine system parameter and/or various combinations of such parameters either directly or indirectly.

In certain embodiments, the controller 30 may be a portion of a processing system including one or more computing devices having memory, processing, and communication hardware. The controller 30 may be a single device or a distributed device, and the functions of the controller 30 may be performed by hardware or software. The controller 30 may comprise digital circuitry, analog circuitry, or a hybrid combination of both of these types. The controller 30 may include one or more Arithmetic Logic Units (ALUs), Central Processing Units (CPUs), memories, limiters, conditioners, filters, format converters, or the like which are not shown to preserve clarity. Further, the controller 30 may be programmable, an integrated state machine, or a hybrid combination thereof. In at least one embodiment, the controller 30 is programmable and executes algorithms and processes data in accordance with operating logic that is defined by programming instructions such as software or firmware. Alternatively or additionally, operating logic for the controller 30 may be at least partially defined by hardwired logic or other hardware. It should be appreciated that the controller 30 may be exclusively dedicated to reducing emissions from the engine 10 or may further be used in the regulation, control, and/or activation of one or more other systems or aspects of the engine system 100.

The schematic flow description that follows provides an illustrative embodiment of a method to control the engine system 100, where operation of the engine system 100 includes the general operating cycle of intake, compression, combustion, and exhaust strokes. Operations illustrated are understood to be exemplary only, and the operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 3:
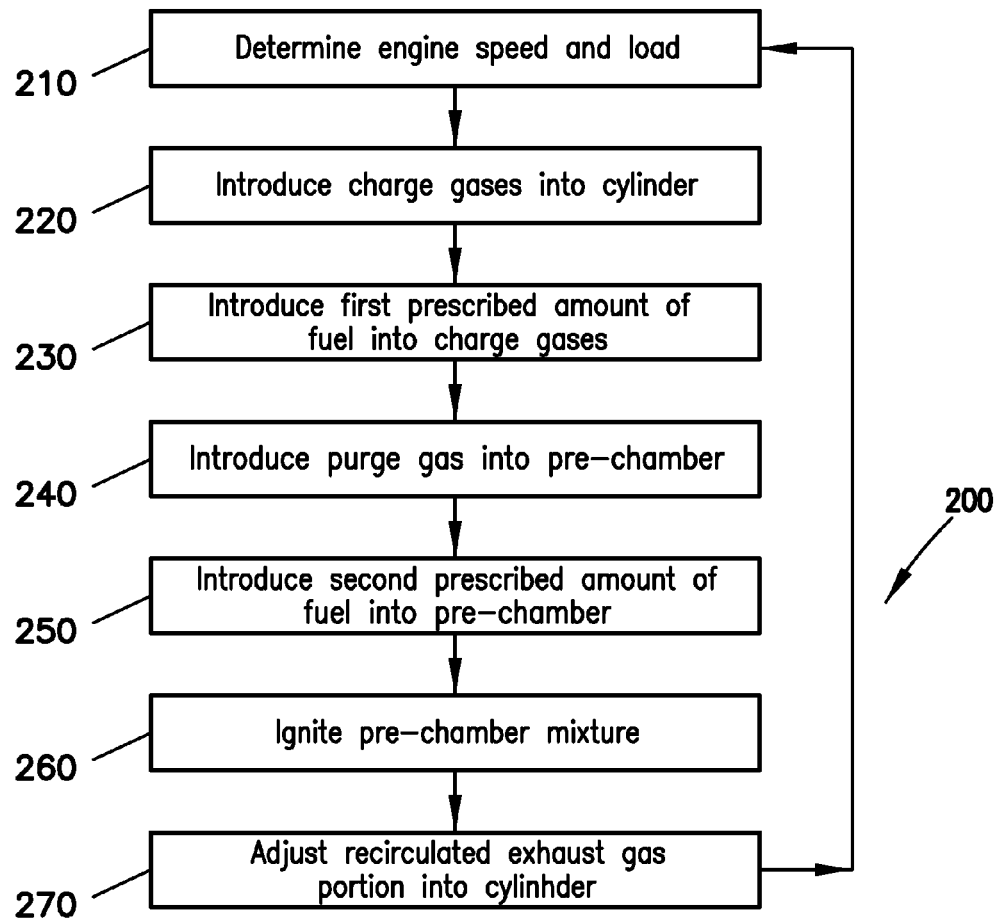
FIG. 3 is a schematic flow diagram of a method for controlling emissions from an engine system according to the present disclosure.

As shown in FIG. 3, a method 200 of controlling the fuel efficiency and emissions of the engine system 100 includes an operation 210 of determining the speed and load of the engine 10. The speed of the engine 10 may be determined using an engine speed sensor 32, and the load of the engine 10 may be determined by any suitable means, including a torque sensor, a fuel quantity sensor, or an air volume sensor that may be used as a proxy of the load on the engine 10. The method 200 may include an operation 220 of introducing charge gases from the intake manifold 24 into the cylinder 12 of the engine 10, the charge gases including an air portion and a recirculated exhaust gas portion. In the operation 220, a portion of the charge gases may further enter into the pre-chamber 40. The method 200 may include an operation 230 of introducing a first prescribed amount of fuel into the charge gases from the intake manifold 24 using the main injector 46 to form the main charge. In at least one embodiment and under certain operating conditions, the main charge may have a stoichiometric mixture of fuel and charge gases. In certain embodiments and under certain operating conditions, the main charge may have a lean or rich mixture. In the operation 230, the first prescribed amount of fuel may be introduced into the charge gases directly in the cylinder 12, in the intake manifold 24, or at any suitable location upstream of the cylinder 12 that enables adequate mixing of the first prescribed amount of fuel and the charge gases to form the main charge.

The method 200 may further include an operation 240 of introducing a purge gas into the pre-chamber 40 via the pre-chamber port 43 such that the purge gas at least partially scavenges the exhaust gases generated in a preceding combustion cycle from the pre-chamber 40 prior to an operation 250 of a subsequent combustion cycle. In certain embodiments, the operation 240 may be performed after the operation 220. The method 200 may further include an operation 250 of introducing a second prescribed amount of fuel into the pre-chamber 40 using the pre-chamber injector 42 to form the pre-chamber charge in the pre-chamber 40. In certain embodiments, the second prescribed amount of fuel may be introduced into the purge gas prior to being introduced into the pre-chamber 40. The method 200 may further include an operation 260 of igniting the pre-chamber charge using the igniter 44, which subsequently ignites and combusts the main charge in the cylinder 12 as described herein. The method 200 may include an operation 270 of adjusting the amount of the recirculated exhaust gas portion introduced into the intake manifold 24 to dilute the charge gases without affecting the AFR. Thus, the method 200 enables the engine system 100 to operate with increased efficiency and reduced emissions by monitoring the engine speed and load conditions, adjusting the degree of dilution of the charge gases via the introduction of EGR gases as needed, and introducing purge gas into the pre-chamber 40 to maintain combustion stability of the pre-chamber charge.

Embodiments of the present disclosure include a method of controlling an engine comprising: determining the speed and load of the engine; introducing charge gases into a combustion cylinder of the engine, the charge gases including an air portion and a recirculated exhaust gas portion; introducing a first prescribed amount of fuel into the charge gases to form a main charge; introducing a purge gas into a pre-chamber via a port, the pre-chamber defined by a wall with the port formed therethrough, the pre-chamber in fluid communication with the cylinder, wherein the purge gas at least partially scavenges exhaust gases generated in a preceding combustion cycle from the pre-chamber prior to a subsequent combustion cycle; introducing a second prescribed amount of fuel into the pre-chamber to form a pre-chamber charge; igniting the pre-chamber charge using an igniter at least partially disposed in the pre-chamber, wherein ignition of the pre-chamber charge subsequently ignites and combusts the main charge; and adjusting the amount of the recirculated exhaust gas portion introduced into the cylinder for a subsequent combustion cycle based on the speed and load of the engine.

In at least one embodiment, the second prescribed amount of fuel is introduced into the purge gas prior to being introduced into the pre-chamber. In further embodiments, the first prescribed amount of fuel is introduced into the charge gases before the charge gases are introduced into the cylinder. In certain embodiments, the fuel is gasoline, alcohol, or a combination thereof, and the purge gas is air. In at least one embodiment, the main charge is a stoichiometric or lean mixture. In such embodiments, the pre-chamber charge is a rich, stoichiometric, or lean mixture. In yet another embodiment, the pre-chamber is connected to the cylinder via one or more orifices through the wall. In certain embodiments, the purge gas is introduced into the pre-chamber prior to the charge gases being introduced into the cylinder. In further embodiments, the timing of introducing the purge gas is dependent on the amount of the recirculated exhaust gas portion introduced into the cylinder for a subsequent combustion cycle. In certain embodiments, the portion recirculated exhaust gas is adjusted via a recirculated exhaust gas valve. In at least one embodiment, the charge gases include a residual portion, and the method further comprises adjusting the amount of the residual portion remaining in the cylinder for the subsequent combustion cycle using variable valve timing based on the speed and load of the engine.

Embodiments of the present disclosure further include a system for controlling an engine comprising: an engine including a combustion cylinder in fluid communication with an intake manifold to enable a flow of charge gases into the cylinder, the cylinder in further fluid communication with an exhaust manifold structured to enable a flow of exhaust gases from the cylinder; a pre-chamber in fluid communication with the cylinder, the pre-chamber defined by a wall having a port therein, the port structured to enable a flow of purge gas into the pre-chamber; a pre-chamber injector in communication the pre-chamber and structured to introduce a first prescribed amount of fuel into the purge gas to form a pre-chamber charge; an igniter disposed at least partially in the pre-chamber and structured to initiate combustion of the pre-chamber charge; a main injector in fluid communication with the charge gases and structured to introduce a second prescribed amount of fuel into the charge gases to form a main charge; an exhaust gas recirculation system in fluid communication with the exhaust manifold and the intake manifold, including an exhaust gas recirculation valve, and structured to recirculate to the intake manifold at a least a portion of the exhaust gases generated in the cylinder by combustion of the fuel; one or more sensors structured to determine the speed and load of the engine; and a controller in communication with the engine, the one or more sensors, and the exhaust gas recirculation valve, the controller operable to operate upon input from the one or more sensors to adjust the portion of recirculated exhaust gas introduced into the intake manifold via the exhaust gas recirculation valve. In certain embodiments, the system further comprises a compressor structured to pressurize the purge gas prior to being introduced into the pre-chamber. In at least one embodiment, the engine further comprises a plurality of combustion cylinders in fluid communication with the intake manifold and the exhaust manifold, wherein each of the plurality of cylinders is in communication with one of a plurality of pre-chambers, each pre-chamber including a separate pre-chamber igniter. In yet another embodiment, the main injector is at least partially disposed within the cylinder and is structured to introduce the second prescribed amount of fuel into the cylinder.

Embodiments of the present disclosure further include an internal combustion engine comprising: a combustion cylinder in fluid communication with an intake manifold structured to introduce charge gases into the cylinder, the cylinder in further fluid communication with an exhaust manifold; a pre-chamber in fluid communication with the cylinder, the pre-chamber defined by a wall having a port therethrough, the port structured to introduce purge gas into the pre-chamber; a pre-chamber injector in communication with the pre-chamber and structured to introduce a first prescribed amount of fuel into the purge gas to form a pre-chamber charge; an igniter disposed at least partially in the pre-chamber and structured to initiate combustion of the pre-chamber charge; a main injector in fluid communication with the cylinder and structured to introduce a second prescribed amount of fuel into the charge gases to form a main charge; an exhaust gas recirculation system in fluid communication with the exhaust manifold and the intake manifold, including an exhaust gas recirculation valve, and structured to recirculate to the intake manifold at a least a portion of the exhaust gases generated in the cylinder due to combustion of the fuel; one or more sensors structured to determine the speed and load of the engine; and a controller in communication with the engine, the one or more sensors, and the exhaust gas recirculation valve, the controller operable to operate upon input from the one or more sensors to adjust the portion of recirculated exhaust gas introduced into the intake manifold via the exhaust gas recirculation valve. In at least one embodiment, the engine further comprises a compressor structured to pressurize the purge gas prior to being introduced into the pre-chamber.

As is evident from the figure and text presented above, a variety of embodiments according to the present disclosure are contemplated. Such system embodiments may be employed in a variety of methods, processes, procedures, steps, and operations as a means of controlling the emission of $NO_x$ from an engine and improving the efficiency of the same. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

The invention claimed is:
1. A method of controlling an engine, the method comprising:
   determining the speed and load of the engine;
   introducing charge gases into a combustion cylinder of the engine, the charge gases including an air portion and a recirculated exhaust gas portion;
   introducing a first prescribed amount of fuel into the charge gases to form a main charge;
   introducing a purge gas into a pre-chamber via a port, the pre-chamber defined by a wall with the port formed therethrough, the pre-chamber further in fluid communication with the cylinder, wherein the purge gas at least partially scavenges residual gases generated in a preceding combustion cycle from the pre-chamber prior to a subsequent combustion cycle;
   introducing a second prescribed amount of fuel into the pre-chamber to form a pre-chamber charge;
   igniting the pre-chamber charge using an igniter at least partially disposed in the pre-chamber, wherein ignition of the pre-chamber charge subsequently ignites and combusts the main charge; and
   adjusting an amount of the recirculated exhaust gas portion introduced into the cylinder for the subsequent combustion cycle based on the speed and load of the engine, wherein a timing of introducing the purge gas is based on the amount of recirculated exhaust gas portion introduced into the cylinder.

2. The method of claim 1, wherein the second prescribed amount of fuel is introduced into the purge gas prior to being introduced into the pre-chamber.

3. The method of claim 1, wherein the first prescribed amount of fuel is introduced into the charge gases before the charge gases are introduced into the cylinder.

4. The method of claim 1, wherein the fuel is gasoline, alcohol, or a combination thereof.

5. The method of claim 1, wherein the purge gas is air.

6. The method of claim 1, wherein the main charge is a stoichiometric or lean mixture.

7. The method of claim 6, wherein the pre-chamber charge is a rich, stoichiometric, or lean mixture.

8. The method of claim 1, wherein the pre-chamber is connected to the cylinder via one or more orifices through the wall.

9. The method of claim 1, wherein the purge gas is introduced into the pre-chamber prior to the charge gases being introduced into the cylinder.

10. The method according to claim 1, wherein the purge gas is oxygen-enriched air.

11. The method according to claim 10, further comprising the step of removing a portion of nitrogen from air to form the oxygen-enriched air.

12. The method according to claim 8, wherein the orifices are one-way valves operable to limit the flow of the main charge from the cylinder into the pre-chamber.

13. The method of claim 1, wherein the amount of the recirculated exhaust gas portion is adjusted via a recirculated exhaust gas valve.

14. The method of claim 1, wherein the charge gases include a residual portion, and the method further comprises adjusting the amount of the residual portion remaining in the cylinder for the subsequent combustion cycle using variable valve timing based on the speed and load of the engine.

15. A system for controlling an engine, the system comprising:
an engine including a combustion cylinder in fluid communication with an intake manifold structured to enable a flow of charge gases into the cylinder, the cylinder in further fluid communication with an exhaust manifold structured to enable a flow of exhaust gases from the cylinder; a pre-chamber in fluid communication with the cylinder, the pre-chamber defined by a wall having a port therethrough, the port structured to enable a flow of purge gas into the pre-chamber controlled by a purge gas flow device;
a pre-chamber injector in communication with the pre-chamber and structured to introduce a first prescribed amount of fuel into the purge gas to form a pre-chamber charge;
an igniter disposed at least partially in the pre-chamber and structured to initiate combustion of the pre-chamber charge;
a main injector in fluid communication with the charge gases and structured to introduce a second prescribed amount of fuel into the charge gases to form a main charge;
an exhaust gas recirculation system in fluid communication with the exhaust manifold and the intake manifold, including an exhaust gas recirculation valve, and structured to recirculate to the intake manifold at a least a portion of the exhaust gases generated in the cylinder by combustion of the fuel;
one or more sensors structured to determine the speed and load of the engine; and
a controller in communication with the engine, the one or more sensors, the exhaust gas recirculation valve, and the purge gas flow device, the controller operable to operate upon input from the one or more sensors to adjust the portion of recirculated exhaust gas introduced into the intake manifold via the exhaust gas recirculation valve, and to adjust a timing of introducing the purge gas into the pre-chamber in response to an amount of the recirculated exhaust gas portion introduced into the cylinder.

16. The system according to claim 15, wherein the port of the pre-chamber is further connected in fluid communication with the exhaust gas recirculation system such that a portion of the exhaust gases generated in the cylinder is introduced into the pre-chamber.

17. The system according to claim 15, wherein the fuel introduced into the purge gas to form the pre-chamber charge is supplied by a fuel reformation system connected to the engine.

18. The system of claim 15, wherein the fuel is gasoline, alcohol, or a combination thereof.

19. The system of claim 15, wherein the purge gas is air, the main charge is a stoichiometric or lean mixture, and the pre-chamber charge is a rich, stoichiometric, or lean mixture.

20. The system of claim 15, the system further comprising a compressor structured to pressurize the purge gas prior to being introduced into the pre-chamber.

21. The system of claim 15, wherein the engine further comprises a plurality of combustion cylinders in fluid communication with the intake manifold and the exhaust manifold, wherein each of the plurality of cylinders is in communication with one of a plurality of pre-chambers, each pre-chamber including a separate pre-chamber igniter.

22. The system of claim 15, wherein the main injector is at least partially disposed within the cylinder and is structured to introduce the second prescribed amount of fuel into the cylinder.

23. An internal combustion engine comprising:
a combustion cylinder in fluid communication with an intake manifold structured to introduce charge gases into the cylinder, the cylinder in further fluid communication with an exhaust manifold;
a pre-chamber in fluid communication with the cylinder, the pre-chamber defined by a wall having a port therethrough, the port structured to introduce purge gas into the pre-chamber chamber in a flow controlled by a purge gas flow device;
a pre-chamber injector in communication with the pre-chamber and structured to introduce a first prescribed amount of fuel into the purge gas to form a pre-chamber charge;
an igniter disposed at least partially in the pre-chamber and structured to initiate combustion of the pre-chamber charge;
a main injector in fluid communication with the cylinder and structured to introduce a second prescribed amount of fuel into the charge gases to form a main charge;
an exhaust gas recirculation system in fluid communication with the exhaust manifold and the intake manifold, including an exhaust gas recirculation valve, and structured to recirculate to the intake manifold at a least a portion of the exhaust gases generated in the cylinder due to combustion of the fuel;
one or more sensors structured to determine the speed and load of the engine; and a controller in communication with the engine, the one or more sensors, the exhaust gas recirculation valve, and the purge gas flow device, the controller operable to operate upon input from the one or more sensors to adjust the portion of recirculated exhaust gas introduced into the intake manifold via the exhaust gas recirculation valve, and to adjust the timing of introducing the purge gas based on an amount of the recirculated exhaust gas portion introduced into the cylinder.

24. The system of claim 23, the engine further comprising a compressor structured to pressurize the purge gas prior to being introduced into the pre-chamber.

* * * * *